US006970814B1

(12) United States Patent
Ashley et al.

(10) Patent No.: US 6,970,814 B1
(45) Date of Patent: Nov. 29, 2005

(54) REMOTE IP SIMULATION MODELING

(75) Inventors: Carl L. Ashley, Essex Junction, VT (US); Charles N. Choukalos, Burlington, VT (US); Scott A. Tetreault, Georgia, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/539,020

(22) Filed: Mar. 30, 2000

(51) Int. Cl.$^7$ .............................................. G06F 17/50
(52) U.S. Cl. ............................. 703/14; 703/15; 703/20; 716/1; 716/2; 716/3; 716/4; 716/17; 716/18
(58) Field of Search .............................. 703/13, 14, 15, 703/16, 17, 20, 21, 22, 23; 709/203, 217, 709/218; 716/1, 4, 10, 2, 3, 17, 18

(56) References Cited

U.S. PATENT DOCUMENTS

| 5,563,801 | A | * | 10/1996 | Lee et al. ...................... 716/16 |
| 5,732,247 | A | | 3/1998 | Dearth et al. |
| 5,822,563 | A | | 10/1998 | Sitbon et al. |
| 5,878,408 | A | * | 3/1999 | Van Huben et al. ............. 707/1 |
| 5,889,954 | A | | 3/1999 | Gessel et al. |
| 5,933,356 | A | * | 8/1999 | Rostoker et al. ............... 703/15 |
| 5,983,277 | A | * | 11/1999 | Heile et al. .................. 709/232 |
| 6,006,332 | A | * | 12/1999 | Rabne et al. ................ 713/201 |
| 6,023,565 | A | * | 2/2000 | Lawman et al. ................ 716/1 |
| 6,067,650 | A | * | 5/2000 | Beausang et al. ........... 714/726 |
| 6,102,961 | A | * | 8/2000 | Lee et al. ........................ 716/1 |
| 6,157,947 | A | * | 12/2000 | Watanabe et al. ........... 709/217 |
| 6,182,897 | B1 | * | 2/2001 | Knowles et al. ....... 235/462.01 |
| 6,246,254 | B1 | * | 6/2001 | Choukalos et al. ............. 326/8 |
| 6,269,467 | B1 | * | 7/2001 | Chang et al. ................... 716/1 |
| 6,425,109 | B1 | * | 7/2002 | Choukalos et al. ............. 716/1 |
| 6,453,419 | B1 | * | 9/2002 | Flint et al. ................... 713/201 |
| 6,519,756 | B1 | * | 2/2003 | Kao et al. ...................... 716/18 |
| 6,535,016 | B2 | * | 3/2003 | Choukalos et al. ............. 326/8 |
| 6,539,536 | B1 | * | 3/2003 | Singh et al. ................... 716/18 |
| 6,540,140 | B1 | * | 4/2003 | Knowles et al. ....... 235/462.01 |
| 6,578,188 | B1 | * | 6/2003 | Pang et al. .................... 716/19 |
| 6,594,799 | B1 | * | 7/2003 | Robertson et al. ............. 716/1 |
| 6,678,645 | B1 | * | 1/2004 | Rajsuman et al. ............ 703/20 |
| 6,687,710 | B1 | * | 2/2004 | Dey ........................ 707/104.1 |

OTHER PUBLICATIONS

Diekman et al., DISCOE: Distributed Design and Analysis to Preserve Intellectual Property, IEEE 1998.*
Hauck et al., Data Security for Web-based CAD, DAC 98, Jun. 15-19, 1998.*
Geppert, IC Design on the World Wide Web, IEEE Spectrum, Jun. 1998.*
Lee et al., CADIC:Computer Aided Design with Cryptosystem, IEEE 1998.*

(Continued)

Primary Examiner—W. Thomson
(74) Attorney, Agent, or Firm—McGinn & Gibb, PLLC; Richard M. Kotulak, Esq.

(57) ABSTRACT

A method and structure for simulating a circuit comprising inputting, from a customer site, initial memory states, and initial input signals to core logic within a host site, simulating the circuit utilizing the host site and the customer site connected though a wide area network (wherein the host site contains the core logic and the customer site contains customer logic, the core logic and the customer logic forming the circuit), comparing test output signals with the desired output signals, and altering the customer logic until the test output signals are consistent with the desired output signals.

27 Claims, 2 Drawing Sheets

OTHER PUBLICATIONS

Lehmann et al., A VHDL Reuse Workbench, IEEE 1996.*
Gajaski et al., Essential Issues for IP Reuse, IEEE Jan. 2000.*
Hong et al., Behavioral Synthesis Techniques for Intellectual Property Protection, IEEE Jun. 1999.*
Hines et al., A Geographically Distributed Framework for Embedded System Design and Validation, DAC 98, Jun. 15-19.*
Wilsey, Web-Based Analysis and Distributed IP, ACM Dec. 5-8. 1999.*
Kucukcakar, Analysis of Emerging Core-based Design Lifecycle, ACM 1998.*
Lach et al., Signature Hiding Techniques for FPGA Intellectual Property Protection, ACM 1998.*
Lach et al., Robust FPGA Intellectual Property Protection Through Multiple Small Watermarks, ACM 1999.*
"Virtual Simulation of Distributed IP-Based Designs", Dalpasso, M. et al., Proc. DAC, IEEE, vol. 36th, p. 50-55, Jun. 21, 1999.
"Specification and Validation of Distributed IP-Based Designs with JavaCAD", Dalpasso, M. et al., Proc. DATE, IEEE, p. 684-688, Mar. 9, 1999.
"A Web-CAD Methodology for IP-Core Analysis and Simulation", Proc. DATE, Fin, A. et al., IEEE, Jun. (2000), vol. 37th, p. 597-600.
"Virtual Fault Simulation of Distributed IP-Based Designs", Dalpasso, M. et al., Proc. DATE, IEEE, Mar. 27 (2000), p. 99-103.

* cited by examiner

REMOTE IP SIMULATION MODELING

BACKGROUND OF THE INVENTION

1. Field of the Invention

The present invention generally relates to simulated modeling and more particularly to a method and system of providing resource-limited customers with additional simulation capacity and protecting host system's core logic and other intellectual property rights.

2. Description of the Related Art

Conventionally, when a customer contracts with a supplier to manufacture application specific integrated circuits (ASIC), the supplier will provide the customer with a software modeling program. Typically, customers utilize many off-the-shelf integrated circuit devices manufactured by the supplier when designing their ASIC device. The principal logic design created by the customer relates to the arrangement and connection of the basic "core" integrated circuit devices manufactured by the supplier.

The software modeling program given to the customer will allow the customer to design the various arrangements, logical connections and other circuit features that are unique to the customer's needs. The software modeling program then provides the customer with a simulated output, given various inputs and initial logic states.

However, the foregoing situation presents the customer and the supplier with problems. For example, customer companies with limited computing resources often find themselves at a competitive disadvantage when attempting to simulate large models because they cannot afford the more sophisticated computers required to simulate such large models. Additionally, ASIC manufactures have concerns that the customer may be able to break through the encryption of the software modeling program to discover (and possibly reverse engineer) the logic of the core elements (e.g. the "core logic") used in the design of the ASIC product being designed by the customer. Further, the manufacturer sometimes provides the modeling software at no charge to the customer with the agreement that the customer will have the manufacturer produce the circuits designed using the software program.

SUMMARY OF THE INVENTION

There is a need for a method and system which reduces the computational burden placed upon small customers and which protects the intellectual property (IP) rights of the supplier. Further, there is a need for a convenient way for the supplier to charge for the use of its modeling program and associated processing time.

It is, therefore, an object of the present invention to provide a structure and method for simulating a circuit comprising inputting, from a customer site, initial memory states, and initial input signals to core logic within a host site, simulating the circuit utilizing the host site and the customer site connected though a wide area network (the host site contains the core logic and the customer site contains customer logic, the core wrapper (i.e., shell of core ports) and the customer logic form the circuit), comparing test output signals with the desired output signals, and altering the customer logic until the test output signals are consistent with the desired output signals. The core logic comprises design elements used in the customer logic.

The core logic is only accessible by the host site and is protected by the host site. The host site supplies device output signals from the core logic to the customer site. The customer site applies the device output signals to the customer logic to produce the test output signals. The host site tracks usage of the core logic. The core logic can be physical hardware devices.

A system for simulating an application specific integrated circuit (ASIC) comprises an interface, a host site connected to the interface (the host site including core logic), and a customer site connected to the host site though the interface, the customer site includes customer logic. The customer site inputs initial memory states and initial input signals to the core logic through the interface, and the host site returns device output signals to the customer site, processes the device output signals through the customer logic to produce test output signals, compares test output signals with desired output signals and alters the customer logic until the test output signals are consistent with the desired output signals. The core logic comprises design elements used in the customer logic. The core logic is only accessible by the host site and is protected by the host site. The host site tracks usage of the core logic. The core logic can be physical hardware devices.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention implements remote IP simulation modeling to allow the ASIC core company to protect their IP, and provide computer resource-limited customers with the simulation capacity they require. This serves to create a value added marketing strategy for the ASIC core company by strengthening their customers competitive position.

The invention solves the foregoing problems by utilizing communication networks (e.g., the internet), to allow remote simulation capabilities. This can be accomplished through interactive and collaborative processing of simulation at both the ASIC supplier's facility and the customer's location. Interactive processing can be implemented which divides the simulation task between geographically separate systems that complement each other through the exchange of event data over the network.

Figure 1:
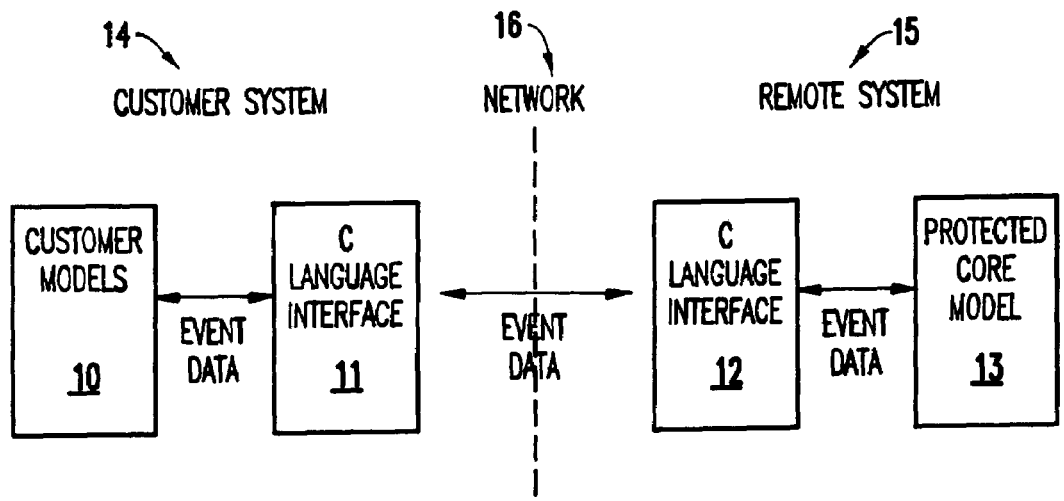
FIG. 1 is a schematic diagram of a network connecting a customer's system with a remote system.

More specifically, as shown in FIG. 1, the invention includes a method and system for performing remote simulation. The example shown in FIG. 1 includes a network 16, such as a wide area network (WAN), which could be for example the Internet, connecting a customer system 14 and a manufacturer's system which is remote from the customer system and is sometimes referred to as a host system or remote system 15. Each system 14, 15 includes interface modules 11, 12 which utilize standard application program interfaces (API) which makes the invention platform independent. The remote system 15 includes a protected core model 13.

The protected core model 13 comprises a test bench of integrated circuit elements that the customer system 14 will join together and/or modify in the customer model 10. The protected core model 13 can comprise software simulations of the integrated circuit elements or may process the signals through the actual hardware integrated circuit elements. The customer model 10 is utilized to prepare a collection and/or modification of various integrated circuit elements on the test bench which uses core Model 13. Therefore, the Customer model 10 determines the initial memory states and initial input and output pin signals on the various elements on the test bench of the core model. The protected core model 13 then processes (either actually or logically through simulation) the signals provided on the input pins to provide output signals on the output pins. This information is then transferred to the Customer model 10 which combines the information and performs the various logical operations that are particular to the customer's design to produce a final output. This final output is then compared to the desired output and the customer model 10 is modified until the output from the simulation is consistent with the desired output.

Therefore, the invention does not perform the simulation exclusively upon the customer system 14 nor the remote system 15. Instead, the invention shares the simulation processing between the two systems. The simulation processing which is performed on the protected core model 13 is limited to processing signals through off-the-shelf integrated circuit devices elements. The design of the device elements is the proprietary intellectual property of the ASIC manufacturer.

The individual device elements may require extensive computing power to simulate because they may include very complex circuitry and perform large numbers of calculations and logical decisions. As mentioned above, the protected core model 13 may actually process the signals through the hardware elements instead of performing a simulation test bench. Generally, the hardware elements themselves will process the signals faster and require less overhead than a simulation program of the same element.

The customer model 10 receives the signals which have been processed through the integrated circuit elements by the core model 13 and performs relatively simple logical operations on the signals output from the core model 13. The type of processing that is performed in the customer model 10 does not require extensive computing power or large resource overhead.

Customers who utilize the inventive remote IP simulation would have established accounts with the host system, which would be checked for security and legal purposes. In addition, the host system is required to keep individual accounts separate so as not to introduce legal issues regarding the customer's IP protection.

The inventive remote simulation involves interactive processing. In this methodology, data is sent between the host 15 and customer 14 sites in real time. Utilizing today's simulators, one can use the C interface 11, 12 capabilities to open ports to the host system during simulation to act as the interface between the core model 13 and the customers logic 10. These interfaces 11, 12 allow for the direct communication between the customer's logic 10 and the core logic 13 as if it was a unified model.

During initialization of the simulation, initial memory states (if applicable) and the initial signal connections would be established along with the list of acceptable desired signals. The host system 15 would run as a simple test bench encompassing strictly the externally visible signals and approved internal signals. The host system 15, would run one cycle at a time utilizing the customers 14 supplied input signals and generating output signals to be sent back to the customer 14. At the end of simulation, the host system 15 would return a final memory state (if applicable).

Figure 2A:
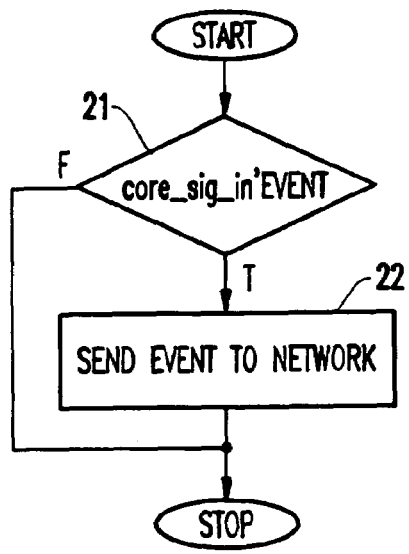
FIG. 2A is a flow diagram illustrating a preferred method of the invention.
Figure 2B:
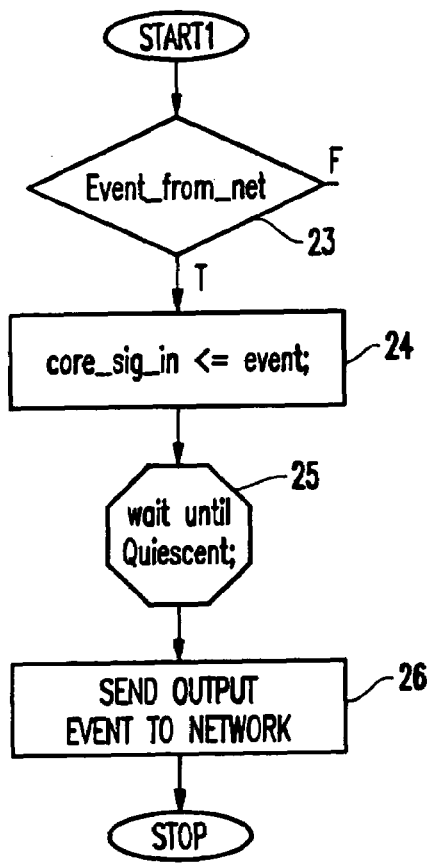
FIG. 2B is a flow diagram illustrating a preferred method of the invention.

The C language interfaces 11, 12 program shown in FIG. 1 have two parallel streams to handle data, as shown in FIGS. 2A and 2B. In FIG. 2A, the interfaces 11, 12 receive events from the network 21 and drive outputs into the resident simulation environment 22 (e.g., customer system 14 or remote system 15). As shown in FIG. 2B, after receiving events from the network 23 and driving outputs 24, the C language interface module waits for a quiescent state 25 and forwards any resultant input changes to the network as events for the remote system 26. Each of these processes shown in FIGS. 2A and 2B is performed simultaneously (e.g., in parallel) on each of the systems 14, 15.

The following pseudo code illustrates the function of the interface during the simulation loop.

DIAGRAM #4—EXAMPLE #1

Init Section

```
procedure host-initialize-connection( ) {
    Open-com-socket(SOC1,ConType,Speed,@Params)
    print SOC1 "$userid $password\n.
    $rc= get SOC1
      if($rc} {
        // we've connected
        print SOC1 "Request Model $SIMMODELNAME"
        print SOC1 " : Additional Parameters @ModelReqs\n"
        $rc= get SOC1
        if($rc) {
          // permission granted
          open (FILE,init-memory)
          print SOC1 "!Start Mem init at $Address,$lenght\n'
          while (data = <FILE>) {
            print SOC1 "data\n"
          }
          Close(FILE)
          Open(FILE,init-regs)
          print SOC1 "!Start Regs Init at $Address,$length\n.
          while (data = <FILE>) {
            print SOC1 "data\n"
          }
          Close(FILE)
          Open(FILE,init-rom)
          print SOC1 "!Start Rom init at $Address,$length\n.
          while (data = <FILE>) {
            print SOC1 "data\n"
          }
          Close(FILE)
          print SOC1 "!Init Params @ModelInitParams\n"
          print SOC1 "!! End Init\n"
        }
    }
    if($rc == 0) {
      print "FAILED!!!!";
    } else {
      print "Connected... Session granted!\n"
    }
    return($rc)
}
// other side of the fence.........
procedure remote-initialize-connection( )
{
     AlwaysRun = 1 for(x=0;x<NumSocketConnectionsToServer;x++)
     {
Initialize-com-socket(Socket[x]);
Soc-active[x] = 0;
while AlwaysRun {
    for(x=0;x<NumSocketconnectionsToServer;x++) {
      if (Soc-active[x] == 0) {
        $rc = ping-com-connection(Socket[x])
```

-continued

```
    if($rc) {
       // we've got a request!!!
       $line = get Socket[x]
       $isgood = check-valid-login($line);
       if(!$isgood) {
          // invalid user connected
          print Socket[x] "$NONVALIDSTRING\n";
       } else {
          // valid user
          $line = get Socket[x]
          ($stat,@TypesAvail) = check-Model__Availablitiy($line)
          if(Sstat) {
             // we've got an available model to run...
             print Socket[x] "$SIMSESSIONGRANTEDSTR\n";
             while (($line = <Socket[x]>) !=~/!! End Init/) {
                // get model init parameters into array
                (@InitParams) =
                Gather-organize-init-params-onto-stack($line);
             }
    for (z=0;z<MaxModelTypesAvail;z++) {
       if ($TypesAvail[z]) {
          // lets check out this model type...
          $ModelID = check-out-model[$line,$TypesAvail[z])
          break;
       }
    }
             // lets initialize the model session and fork off the
             executable
             // process...
             Soc-active[x] = 1; // socket is active
          pid[x] =fork( start-new-model-simulation-loop
    ($ModelID,@InitParams)
       } else {
       // no cores available to run .... terminate session..
       print Socket[x]'$TERMINATESTR\n";
             }
          }
       }
    ) else {
       // socket is active.., check for end of sim run stuff...
       if(check-is-pid-still-running(pid[x]) == 0) {
          // pid has finished.., we've finished the model sim previously
          // checked out.
          Soc-active[x] = 0;
          }
       }
    }
} // end of while loop.........
print "Shutting Down Model Sim Server!!! \n"
}// end of procedure
```

The next example contains pseudo code for the interface during the main simulation loop cycle. This will help to illustrate the idea behind the handshaking of the host and the remote system.

Diagram #4, Example 2:

```
// Example 2 Sim Loop Interface code
ENDSIM = FALSE
While (!ENDSIM) {
   // Start DELTA iteration Step
for(x=0;x<NUMREMOTEMODELS;x++) {
    MODELTOSIM = @SIMMODELARRAY[x]
    PUT portcon-host[x] "Query: Inputs $MODELTOSIM\n"
    wait for @inputs = GET portcon-host[x]
    PUT portcon-remote[x] 'RunDelta $MODELTOSIM @inputs\n"wait
    for @outputs = GET portcon-remote[x]
    PUT portcon-host~x] "outputs $MODELTOSIM @outputs\n"
}
```

-continued

```
for(x=0;x<NUMREMOTEMODELS;x++) {
    PUT portcon-host[x] "DELTA STEP DONE\n"
    PUT portcon-remote[x] 'DELTA STEP DONE\n"
    } wait for ENDSIM-sig = GET portcon-MasterHostPort // pass the
ENDSIM-sig for(x=0;x<NUMREMOTEMODELS;x++) {
    PUT portcon-remote[x] "ENDSIM signal = $ENDSIM-sig\n"
    }
}
```

With the invention, the manufacturer's core logic designs are not available to the customer because only simulation (or actual) signal responses are supplied to the customer system 14. By having the manufacturer administer the core simulations, access to the core can be controlled and usage can be limited directly by the manufacturer. Further, the manufacturer can charge for CPU usage and other similar overhead items as the customer system processes signals through the protected core model 13.

Also, with the invention, the manufacturer has the opportunity to monitor the usage of the core to determine if the core is being utilized properly or whether a customer is attempting to bypass security measures to access the proprietary core logic. In addition, the manufacturer can observe how the device elements are being utilized to make improvements and/or modifications to the integrated circuit devices elements themselves.

Unlike most network distributed computing techniques, the inventive remote IP simulation technique splits the simulation processing over the network. With the invention, actual parallel shared execution is accomplished with the invention. As mentioned above, the ASIC manufacturers portion of the simulation (e.g., for the core 13) is shielded from the customer system 14 by the interfaces 11, 12. Once again, having the manufacturer administer the core simulation 13 allows the manufacture to characterize the customer's usage and provide subsequent feedback to the customer based on their usage of the core 13. For example, with the invention, the manufacturer is unable to inform the customer if incorrect sequences of operation are assumed during simulation. Further, the customers core usage can be the basis for marketing information and for improving the core devices themselves. To the contrary, the conventional systems which merely supply the customer with a simulation program cannot monitor the customer's usage patterns of the core models.

Figure 3:
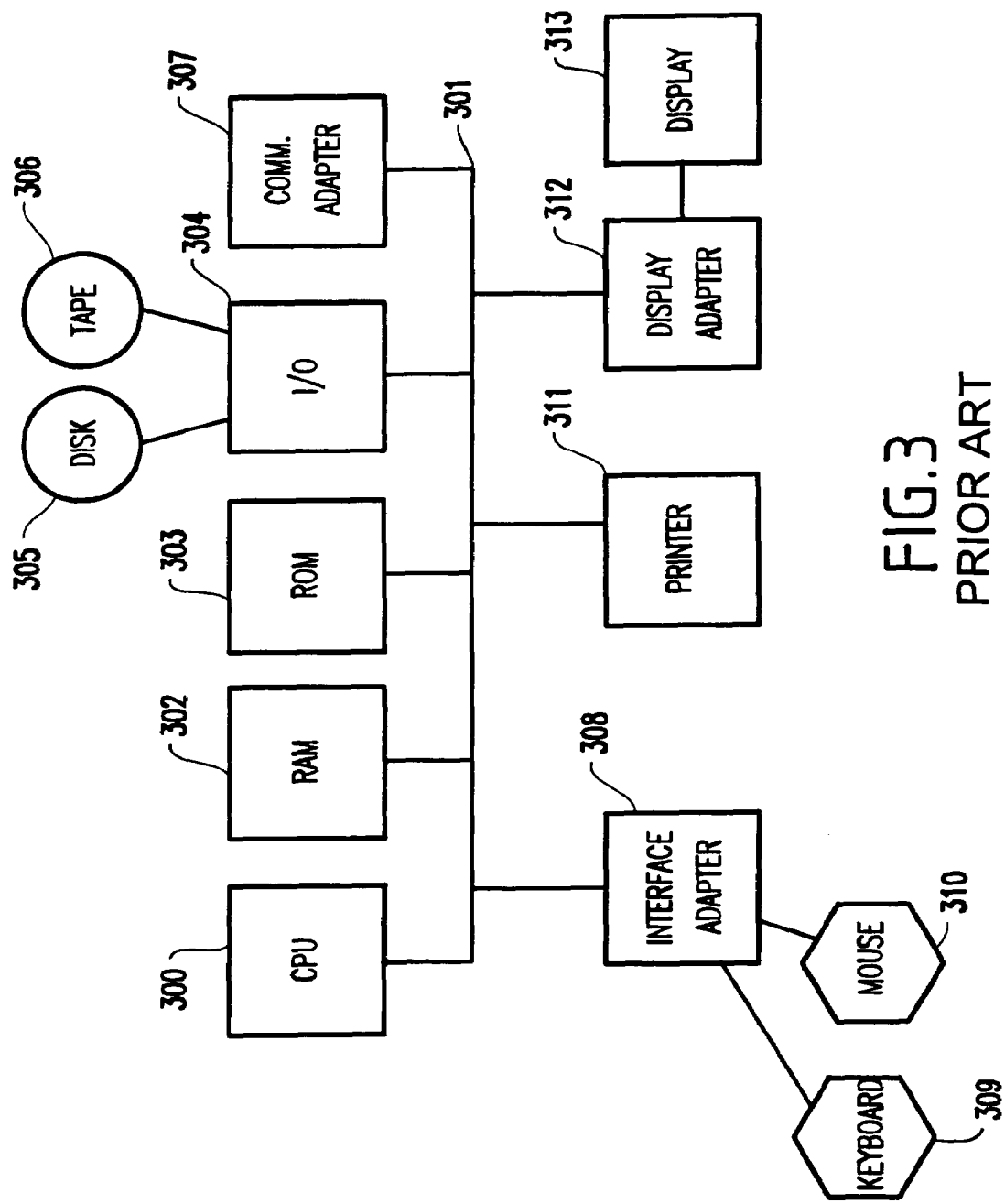
FIG. 3 is a hardware embodiment of the invention.

While the overall methodology of the invention is described above, the invention can be embodied in any number of different types of systems and executed in any number of different ways, as would be known by one ordinarily skilled in the art. For example, as illustrated in FIG. 3, a typical hardware configuration of an information handling/computer system in accordance with the invention preferably has at least one processor or central processing unit (CPU) 300. For example, the central processing unit 300 could include various image/texture processing units, mapping units, weighting units, classification units, clustering units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, filtering, adding, subtracting, comparing, etc.

The CPU 300 is interconnected via a system bus 301 to a random access memory (RAM) 302, read-only memory (ROM) 303, input/output (I/O) adapter 304 (for connecting peripheral devices such as disk units 305 and tape drives 306 to the bus 301), communication adapter 307 (for connecting an information handling system to a data processing network) user interface adapter 308 (for connecting a peripherals 309–310 such as a keyboard, mouse, imager, microphone, speaker and/or other interface device to the bus 301), a printer 311, and display adapter 312 (for connecting the bus 301 to a display device 313). The invention could be implemented using the structure shown in FIG. 3 by including the inventive method, described above, within a computer program stored on the storage device 305. Such a computer program would act on a model supplied through the interface units 309–310 or through the network connection 307. The system would then automatically perform the modeling operation and output the same on the display 313, through the printer 311 or back to the network 307.

Therefore, as shown above, the invention divides the processing between the customer system 14 and the remote system 15. This allows the manufacturer's remote system 15 to perform the computationally intensive processing associated with modeling the core logic devices. At the same time, the customer's system uses the results from the core logic devices 13 to simultaneously model the customer's individual ASIC logic design. The invention protects the intellectual property rights the manufacturer has in the core logic and allows the manufacturer to track the customer's usage of the core logic (to charge for the usage, improve the logic devices, and perform additional marketing). The invention also provides the customer with the extensive overhead of the manufacturer's system 15 and allows the manufacturer to provide input with respect to potential customer problems.

While the invention has been described in terms of preferred embodiments, those skilled in the art will recognize that the invention can be practiced with modification within the spirit and scope of the appended claims.

What is claimed is:

1. A process for simulating a circuit comprising:
   inputting, from a customer site, initial memory states, and initial input signals to core logic within a host site;
   simulating said circuit utilizing said host site and said customer site connected though a wide area network, wherein said host site contains said core logic and said customer site contains customer logic, wherein a combination of said core logic and said customer logic form said circuit, and wherein said simulating process is divided between said customer site and said host site such that said customer site and said host site simultaneously simulate said circuit;
   comparing test output signals with said desired output signals;
   altering said customer logic until said test output signals are consistent with said desired output signals; and
   altering said core logic based on customer site usage of said core logic.

2. The process in claim 1, wherein said core logic comprises design elements used in said customer logic.

3. The process in claim 1, wherein said core logic is only accessible by said host site and is protected by said host site.

4. The process in claim 1, wherein said host site supplies device output signals from said core logic to said customer site.

5. The process in claim 4, wherein said customer site applies said device output signals to said customer logic to produce said test output signals.

6. The process in claim 1, wherein said host site tracks usage of said core logic.

7. The process in claim 1, wherein said core logic comprises physical hardware devices.

8. A process for simulating an application specific integrated circuit (ASIC) comprising:
   inputting, from a customer site, initial memory states, and initial input signals to core logic within a host site;
   simulating said ASIC utilizing said host site and said customer site connected though a wide area network, wherein said host site contains said core logic and said customer site contains customer logic, wherein a combination of said core logic and said customer logic form said ASIC, and wherein said simulating process is divided between said customer site and said host site such that said customer site and said host site simultaneously simulate said ASIC;
   comparing test output signals with said desired output signals;
   altering said customer logic until said test output signals are consistent with said desired output signals; and
   altering said core logic based on customer site usage of said core logic.

9. The process in claim 8, wherein said core logic comprises design elements used in said customer logic.

10. The process in claim 8, wherein said core logic is only accessible by said host site and is protected by said host site.

11. The process in claim 8, wherein said host site supplies device output signals from said core logic to said customer site.

12. The process in claim 11, wherein said customer site applies said device output signals to said customer logic to produce said test output signals.

13. The process in claim 8, wherein said host site tracks usage of said core logic.

14. The process in claim 8, wherein said core logic comprises physical hardware devices.

15. A system for simulating an application specific integrated circuit (ASIC) comprising:
   an interface;
   a host site connected to said interface, said host site including core logic; and
   a customer site connected to said host site though said interface, said customer site including customer logic,
   wherein said host site and said customer site are adapted to divide simulation of said ASIC and simultaneously simulate said circuit,
   wherein said customer site inputs, initial memory states and initial input signals to said core logic through said interface and said host site returns device output signals to said customer site,
   wherein said customer site processes said device output signals through said customer logic to produce test output signals, and
   wherein said customer site compares test output signals with desired output signals and alters said customer logic until said test output signals are consistent with said desired output signals; and
   wherein said host site alters said core logic based on customer site usage of said core logic.

16. The system in claim 15, wherein said core logic comprises design elements used in said customer logic.

17. The system in claim 15, wherein said core logic is only accessible by said host site and is protected by said host site.

18. The system in claim 15, wherein said host site tracks usage of said core logic.

19. The system in claim 15, wherein said core logic comprises physical hardware devices.

20. The system in claim 15, wherein said interface connects said host site and said customer site through a wide area network.

21. A program storage device readable by machine tangibly embodying a program of instructions executable by machine to perform a method for simulating a circuit comprising:

inputting, from a customer site, initial memory states, and initial input signals to core logic within a host site;

simulating said circuit utilizing said host site and said customer site connected though a wide area network, wherein said host site contains said core logic and said customer site contains customer logic, wherein a combination of said core logic and said customer logic form said circuit, and wherein said simulating process is divided between said customer site and said host site such that said customer site and said host site simultaneously simulate said circuit;

comparing test output signals with said desired output signals;

altering said customer logic until said test output signals are consistent with said desired output signals; and altering said core logic based on customer site usage of said core logic.

22. The program storage device in claim 21, wherein said core logic comprises design elements used in said customer logic.

23. The program storage device in claim 21, wherein said core logic is only accessible by said host site and is protected by said host site.

24. The program storage device in claim 21, wherein said host site supplies device output signals from said core logic to said customer site.

25. The program storage device in claim 21, wherein said customer site applies said device output signals to said customer logic to produce said test output signals.

26. The program storage device in claim 21, wherein said host site tracks usage of said core logic.

27. The program storage device in claim 21, wherein said core logic comprises physical hardware devices.

\* \* \* \* \*